(12) United States Patent
Aboul-Magd et al.

(10) Patent No.: US 11,395,336 B2
(45) Date of Patent: Jul. 19, 2022

(54) METHOD AND APPARATUS FOR PRIORITY TRANSMISSION OF WLAN FRAMES

(71) Applicant: Huawei Technologies Co., Ltd., Shenzhen (CN)

(72) Inventors: Osama Aboul-Magd, Ottawa (CA); Sheng Sun, Ottawa (CA); Yan Xin, Ottawa (CA); Jung Hoon Suh, Ottawa (CA); Kwok Shum Au, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 98 days.

(21) Appl. No.: 16/818,975

(22) Filed: Mar. 13, 2020

(65) Prior Publication Data

US 2021/0289552 A1 Sep. 16, 2021

(51) Int. Cl.
| | | |
|---|---|---|
| H04W 74/08 | (2009.01) | |
| H04W 72/10 | (2009.01) | |
| H04W 74/00 | (2009.01) | |
| H04W 28/02 | (2009.01) | |
| H04W 72/12 | (2009.01) | |

(52) U.S. Cl.
CPC ......... *H04W 74/0816* (2013.01); *H04L 47/14* (2013.01); *H04W 72/10* (2013.01); *H04W 72/1242* (2013.01); *H04W 74/002* (2013.01); *H04W 74/0875* (2013.01)

(58) Field of Classification Search
None
See application file for complete search history.

(56) References Cited

U.S. PATENT DOCUMENTS

| | | | | |
|---|---|---|---|---|
| 2014/0119288 | A1* | 5/2014 | Zhu | H04W 72/0406 370/329 |
| 2015/0139209 | A1 | 5/2015 | Park et al. | |
| 2018/0295627 | A1* | 10/2018 | Li | H04L 1/1621 |
| 2020/0359300 | A1* | 11/2020 | Hong | H04W 48/12 |
| 2020/0367263 | A1* | 11/2020 | Cavalcanti | H04W 28/06 |

FOREIGN PATENT DOCUMENTS

| | | |
|---|---|---|
| CN | 102075440 A | 5/2011 |
| CN | 105142207 A | 12/2015 |
| CN | 106413112 A | 2/2017 |

OTHER PUBLICATIONS

Iyer, K, et al. "Packet Prioritization Issues follow-up" IEEE 802.11-18-2098-01-0rta 2018.
Zuo, X, et al. "Considerations of New Queue Mechanism for Real-Time Application" IEEE 802.11-19/1175r0 2019.

* cited by examiner

*Primary Examiner* — Ayaz R Sheikh
*Assistant Examiner* — Sori A Aga
(74) *Attorney, Agent, or Firm* — Slater Matsil, LLP

(57) ABSTRACT

Aspects of the present application provide mechanisms for minimizing latency in real time application (RTA) traffic on wireless LANs. A wireless electronic device identifies real time application network packets in the Application layer, gives them a novel MPDU frame type and subtype, and maps them into a high priority access category such as AC_VO. Upon receiving a TXOP, the device preferentially transmits RTA frames before frames mapped to the access category awarded the TXOP. Additional aspects allow for pre-emptive priority transmission of RTA frames.

8 Claims, 5 Drawing Sheets

METHOD AND APPARATUS FOR PRIORITY TRANSMISSION OF WLAN FRAMES

TECHNICAL FIELD

The present disclosure relates generally to wireless communications, and in particular embodiments, to low latency scheduling of Real Time Application frame traffic through Wireless Local Area Networks (WLANs).

BACKGROUND

The IEEE 802.11 wireless local area networking (WLAN) standard defines one of the most widely deployed wireless technologies in the world. The popularity of wireless networking is driven by the ubiquity of portable mobile handheld devices, and the convenience of untethered communications. With the increasing deployment of multimedia content on the Internet—such as digital video, voice over IP (VoIP), videoconferencing, and real-time applications such as multi-player networked games—along with the deployment of time-sensitive critical applications, there is a strong motivation to develop QoS features to meet the more stringent performance requirements.

Regarding QoS provisions, the legacy standards IEEE 802.11a/b/g only have the basic distributed coordination function (DCF) and the optional point coordination function (PCF) enhancements, such as collision avoidance and a first in first out (FIFO) scheduler. In the DCF-based schemes, the access to the medium is given using a carrier sense multiple access (CSMA) scheme. Though statistically fair, not all sessions are created equal regarding expected network performance. During heavy network loads, DCF+CSMA can potentially result in sessions being deprived of their required bandwidth share. There is no proper mechanism to distinguish between the sessions on priority basis in the DCF-based environments. The legacy standards of IEEE 802.11 a/b/g/ have no standard mechanisms to ensure QoS. Because these standards do not incorporate admission control, performance degradation occurs during heavy traffic load.

The IEEE 802.11e amendment introduces a Hybrid Coordination Function (HCF), a new coordination function proposed to enhance DCF. HCF introduces the concept of transmission opportunity (TXOP) and uses two methods to acquire the TXOP: the first method is contention-based and it is known as enhanced distributed channel access (EDCA), and the second method is contention-free and it is known as HCF-controlled channel access (HCCA). Both these schemes are useful for QoS provisioning to support delay-sensitive voice and video applications.

EDCA uses timing information based on contention window sizes to differentiate between high priority and low priority access categories. The central coordinator assigns a contention window of shorter length to the high priority access categories to help them to obtain access to the medium and transmission opportunity (TXOP) before the lower priority ones. To differentiate further, interframe spacing (IFS) can be varied according to different access categories. Instead of using a distributed interframe spacing (DIFS) as for the DCF traffic, a new interframe spacing called arbitration interframe spacing (AIFS) is used. AIFS is a number of time slots an EDCA function (EDCAF) waits before contending for the medium. Therefore, a traffic category having smaller AIFS gets higher priority.

Table 1 presents the minimum and maximum contention window durations for the four Access Categories in EDCA using default OFDMA parameters of $aCW_{min}=15$ μs, $aCW_{max}=1023$ μs, and slot duration of 9 μs.

TABLE 1

Contention Window and TXOP Durations by EDCA Access Category

| Access Category | Minimum Contention Window(μs) | Maximum Contention Window(μs) | AIFS (# of slots) | TXOP Limit (ms) |
|---|---|---|---|---|
| AC_BK | 15 | 1023 | 7 | 2.528 |
| AC_BE | 15 | 1023 | 3 | 2.528 |
| AC_VI | (15 + 1)/2 − 1 | 15 | 2 | 4.096 |
| AC_VO | (15 + 1)/4 − 1 | (15 + 1)/2 | 2 | 2.080 |

The lowest-latency access category, AC_VO (Voice), has a contention window that ranges from 3 to 8 microseconds under these conditions. Even with this relatively short back-off time, under worst-case conditions, i.e. a high density of voice traffic mapped to AC_VO concurrently with real time application traffic, latency of real time application traffic mapped to AC_VO can cause an unsatisfactory user experience. It is desired to provide a shorter maximum latency for real-time application traffic in wireless LANs.

SUMMARY OF THE INVENTION

Example embodiments of the present disclosure provide a method and apparatus for priority transmission of WLAN frames.

In accordance with an example aspect of the present disclosure, the apparatus is a wireless electronic device for communicating over a wireless LAN. The wireless electronic device comprises one or more processors coupled to a network interface and a computer readable storage medium, the storage medium storing instructions executable by the processor to perform a method of communicating over a wireless LAN. The method comprises obtaining a transmission opportunity via Enhanced Distributed Channel Access for a first access category and transmitting a first traffic frame comprising a header. The header includes a frame type subfield and a frame subtype subfield, the values of the frame type and frame subtype subfields identifying the first traffic frame as a real time application frame. This header advantageously allows layers of network protocols to quickly identify real time application frames for privileged access to a transmission medium.

Furthermore in the method, although the first traffic frame is mapped to a second access category different from the first access category that was granted the TXOP, the first traffic frame is the first frame transmitted during the transmission opportunity. Being transmitted first irrespective of the access category awarded a TXOP gives real time application traffic a further advantage in transmission priority than is currently available to the AC_VO category, alleviating much of the lag experienced by real time application traffic attempting to travel via a WLAN.

In accordance with another example aspect of the present disclosure, the second access category to which the first traffic frame is mapped is the voice (AC_VO) category. This advantageously gives RTA traffic access to the shortest average contention windows and multi-frame TXOPs during which to quickly move any queued RTA traffic.

In accordance with another example aspect of the present disclosure, the frame type subfield takes on the two-bit value "11." This allows use of a frame subtype as-yet unallocated by the IEEE, such as subtypes 1000-1111 of type 11. The setting of the MSB (bit 7) to 1 is logically consistent with the QoS frame subtypes established in frame type 10 (Data) by IEEE 802.11e.

In accordance with an alternate aspect of the present disclosure, the method for communicating over a wireless LAN comprises obtaining a TXOP via EDCA for a first AC, then transmitting a portion of a first non-RTA traffic frame. Subsequently, transmission of the first traffic frame is paused to make room for transmitting a second traffic frame. The second traffic frame is a real time application frame identified as such by a frame type and subtype in its header, and is transmitted during the TXOP despite being mapped to a different AC. Such pausing of the first frame to allow transmission of the second frame prevents real time application traffic from having, as in the present state of the art, to wait out a long frame transmission, or worse, wait further after the long frame transmission for its station to contend for a TXOP again, before being transmitted. In an additional aspect, the first traffic frame resumes transmission after the second traffic frame has been completely transmitted. This resumption has the advantage of avoiding the extra expense of airtime to resend the first portion of the non-RTA frame.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

Figure 1A:
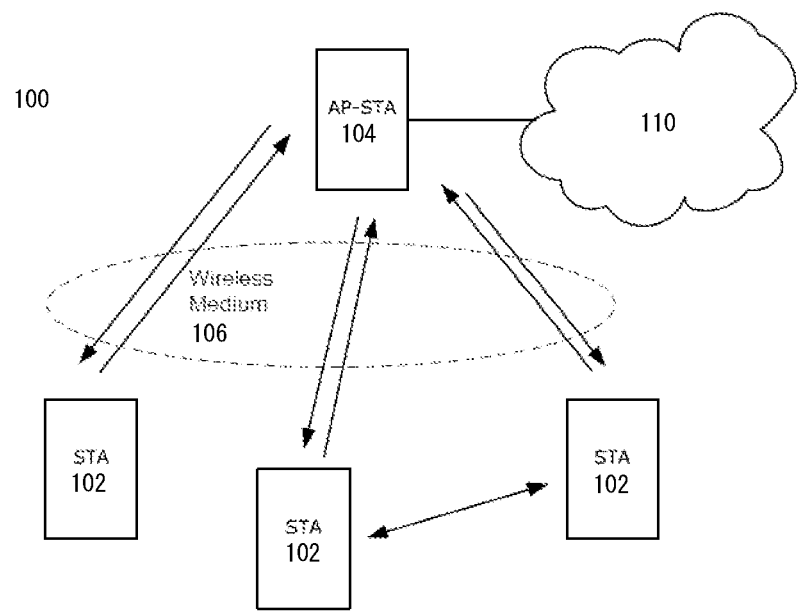
FIG. 1A is a block diagram of a wireless local area network according to an embodiment of the present disclosure.

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

The present disclosure relates to communication in a wireless LAN (WLAN) between components of a basic service set (BSS). With reference to FIG. 1, a BSS 100 comprises one or more access points (AP) 104 which provide connectivity over a wireless medium 106 between client STAs 102 and a wide area network (WAN) such as the Internet, a core network, a Radio Access Network, or other networks. Access points may include wireless routers, mobile phone personal hotspots, Wi-Fi equipped PCs, Wi-Fi equipped cable modems, or any other electronic devices capable of hosting an IEEE 802.11 connection. Wireless medium 106 may comprise frequency channels in various spectral bands including those on and around 900 MHz, 2.4 GHz, 5 GHz, 60 GHz, and any other portions of unlicensed spectrum for scientific and industrial use. Where a frequency is cited, the actual band comprises a range of frequencies around the cited frequency. The AP 104 communicates with one or more of the STAs 102 over one or more air interfaces using wireless media 106 e.g. radio frequency (RF), microwave, infrared (IR), etc. The air interfaces may utilize any suitable radio access technology. For example, the BSS 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces.

STAs 102 may comprise cellular phones, tablets, computers, consumer entertainment devices, appliances, Internet of Things (IoT) clients, smart watches, or any other devices capable of connecting to a Wi-Fi Basic Service Set. Communication may occur in the uplink (STA to AP) direction or the downlink (AP to STA) direction. In certain circumstances direct STA to STA communication (sidelink communication) can occur. Although certain numbers of these components or elements are shown in FIG. 1, any reasonable number of these components or elements may be included in the system 100.

Figure 1B:
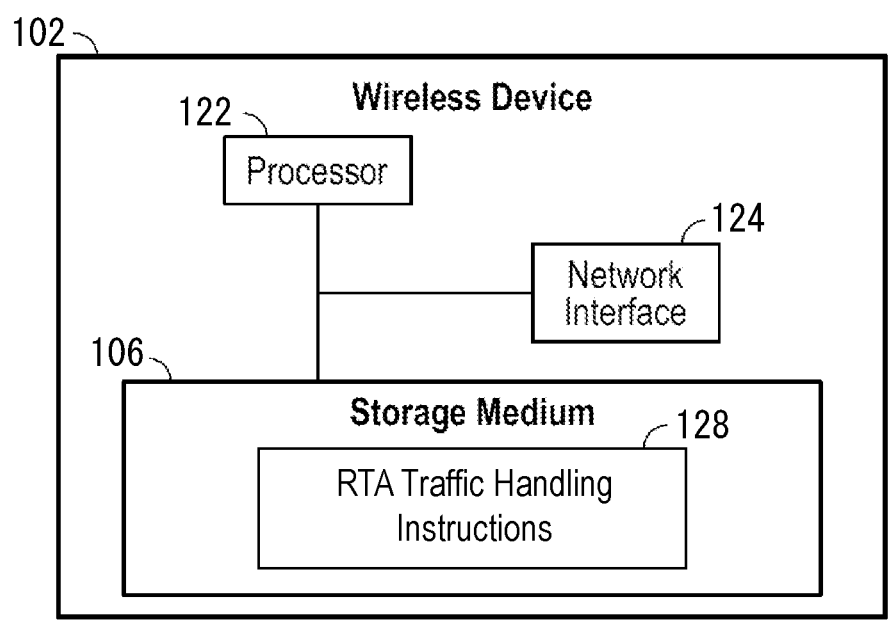
FIG. 1B is a block diagram of a wireless electronic device according to an embodiment of the present disclosure.

With reference to FIG. 1B, a wireless communication device 102 functioning as a STA in a BSS may take the form of a smartphone, portable computer, consumer electronic appliance, or other piece of Wi-Fi enabled technology and comprises one or more processors 122 coupled to a computer readable storage medium 106 and a network interface 124. The storage medium stores the operating software for the wireless communication device 102 including instructions 128 for handling real time application traffic according to the present disclosure. Processor 122 may comprise an integrated circuit, such as a central processing unit (CPU), application processor (AP), field programmable gate array (FPGA) or application-specific integrated circuit (ASIC). Network interface 124 may comprise a baseband processor contention parameters that determine which AC wins access to the wireless medium each time it is up for contention.

Table 2, reproduced from Table 10-1 of IEEE P802.11-REVmd/D3.0, October 2019 indicates how UP is mapped to AC in EDCA.

TABLE 2

Mapping of User Priority to Access Category

| Priority | UP (Same as IEEE 802.1D user priority) | IEEE 802.1D designation | AC | Transmit queue (dot11Alternate-EDCAActivated false or not present) | Transmit queue (dot11Alternate EDCAActivated true) | Designation(M138) |
|---|---|---|---|---|---|---|
| Lowest | 1 | BK | AC_BK | BK | BK | Background |
|  | 2 | — | AC_BK | BK | BK | Background |
|  | 0 | BE | AC_BE | BE | BE | Best Effort |
|  | 3 | EE | AC_BE | BE | BE | Best Effort |
|  | 4 | CL | AC_VI | VI | A_VI | Video (alternate) |
|  | 5 | VI | AC_VI | VI | VI | Video (primary) |
|  | 6 | VO | AC_VO | VO | VO | Voice (primary) |
| Highest | 7 | NC | AC_VO | VO | A_VO | Voice (alternate) | or other circuits for implementing a Medium Access Controller, a Physical layer, transmitting amplifiers, and one or more RF antennas as required for communicating over a wireless medium. The network interface 124 may utilize any suitable radio access technology. For example, the communication system 102 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the network interface 124. Storage medium 106 may comprise nonvolatile storages for unpowered storage of software such as EEPROM, NOR flash, and NAND flash, as well as volatile storages for application processor workspace such as DRAM and SRAM.

STA devices 102 such as personal computers, tablets, smartphones, thin client notebooks, and interactive smart TVs are capable of running high performance real-time applications such as live action games, musical collaborations, augmented reality, vehicle navigation, and other programs requiring low-latency interaction with other electronic devices for a satisfactory, and in some cases safe, user experience. In a case where many STAs 102 share one AP 104, bandwidth is shared and devices are required to contend with one another for access to the wireless medium 106. Quality of Service (QoS) protocols currently exist in IEEE 802.11 to give certain traffic classes such as voice and video a competitive advantage over other less time sensitive classes of traffic such as file transfer, email, software updates, and other interruption-tolerant communication sessions.

Figure 2:
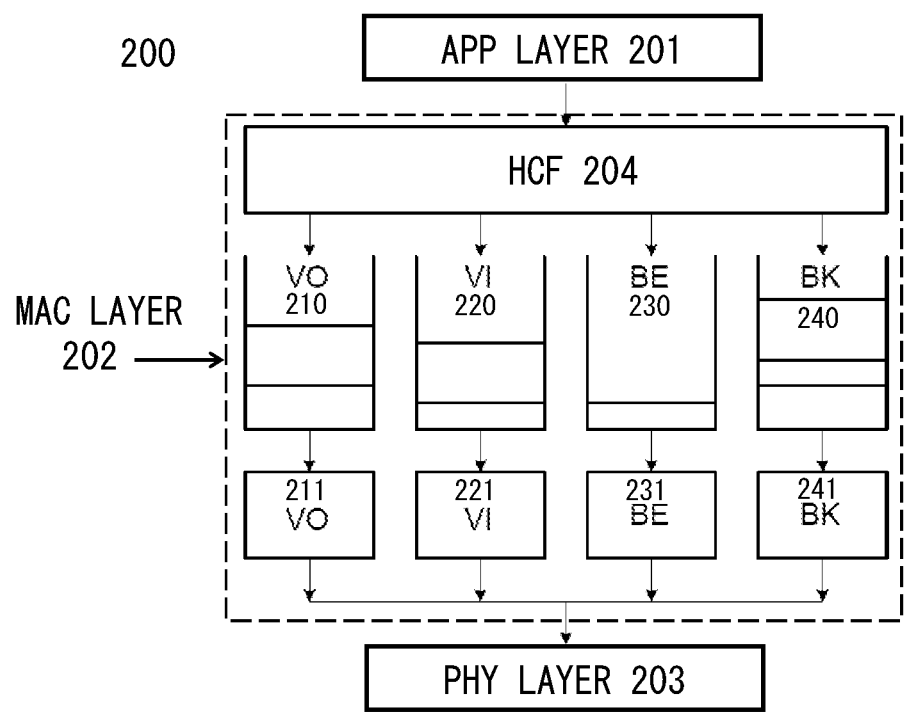
FIG. 2 illustrates the access category mapping and contention functionality of Enhanced Distributed Channel Access.

The contention-based Enhanced Distributed Channel Access is described with reference to FIGS. 1A and 2. FIG. 2 illustrates a block diagram 200 of EDCA procedures. The Application (APP) layer 201 of a protocol stack generates packets for sending over an electronic device's internet connection 110, which is established by way of an 802.11 compliant access point (AP) 104. The packets must first be sent to the MAC layer 202 and packaged as MAC Protocol Data Units (MPDU), also called MAC frames. A User Priority field (UP) which can be valued from 0 to 7, is stored in the frame header and is used by the Hybrid Coordination Function 204 to map MAC frames based on their UP into one of four Access Categories (AC), each with its own Referring to FIG. 2, the most favored priority traffic, requiring latency of approximately 10 ms, is mapped to AC VO 210. Traffic for which latency of about 100 ms is allowable gets mapped to AC VI 220. The bulk of network traffic is mapped to AC BE 230, and low priority traffic frames which are assigned to wait for leftover network bandwidth are mapped to AC BK 240. Each of queues 210 220 230 and 240 contends for the wireless medium via its own respective EDCA Function (EDCAF) 211, 221, 231, and 241 respectively. These EDCAFs take as inputs the parameters listed in Table 1 and calculate a contention window (CW) for each EDCAF, which determines the time it must wait before requesting a TXOP. The TXOP has a duration, during which a STA may send to the physical layer as many MAC frames as possible from the AC queue to which the TXOP belongs before the duration elapses. MAC frames are sent to the PHY 203 for adding PHY preambles, encoding and modulation into PHY Protocol Data Units (PPDUs, or WLAN traffic frames), and eventual transmission. The higher priority ACs have small contention window sizes and tend to receive the TXOP preferentially. Lower priority ACs tend to get a TXOP when there are no frames in the higher priority queues or when their randomly assigned backoff times (part of the CW calculation) happen to be shorter than the randomly assigned backoff time given to a higher priority AC. Without the random backoff timers, lower priority traffic would be almost entirely deferred as long as any higher priority traffic existed in queue.

Despite the current provision of QoS in 802.11, simulations and real-world observations show that even when traffic frames are mapped to AC_VO, latency times for the most performance intensive real time applications such as high frame-rate gaming and vehicular control are a limiting factor in the utility of such applications and manifest themselves as noticeable lag between control inputs and output responses coming over the network. This is owing to a number of factors. Firstly, when one of a STA's EDCAFs wins contention for the TXOP, only frames from that EDCAF's queue are allowed to transmit during the TXOP. Secondly, each AC's queue is a FIFO queue, so RTA traffic frames mapped to AC_VO must wait for other AC_VO traffic ahead of them to transmit. Thirdly, if a RTA traffic frame is next to transmit, it might still need to wait for a long frame of another access category (a bulk file transfer in AC_BE, for example) to finish before it can transmit. A mechanism is desired for enabling low latency requirement traffic frames, for example real time application frames, to get around these restrictions to enable higher priority transmission of traffic frames than is currently available in WLAN traffic scheduling.

Aspects of the present disclosure propose a method of communicating over a wireless LAN comprising transmitting a first traffic frame, comprising a first header including a frame type and subtype, and mapping the traffic frame to a first Enhanced Distributed Channel Access (EDCA) access category (AC). The method further comprises obtaining a transmission opportunity (TXOP) for a second EDCA AC to transmit traffic frames on a wireless medium, and based on the values of the frame type and subtype, transmitting the first traffic frame during the TXOP before any other traffic frames which are mapped to the first EDCA AC.

An example embodiment of the method of the present disclosure is described below with regard to FIGS. 3 and 4. FIG. 5 then illustrates operation of a Basic Service Set according to embodiments of the present disclosure.

Figure 3:
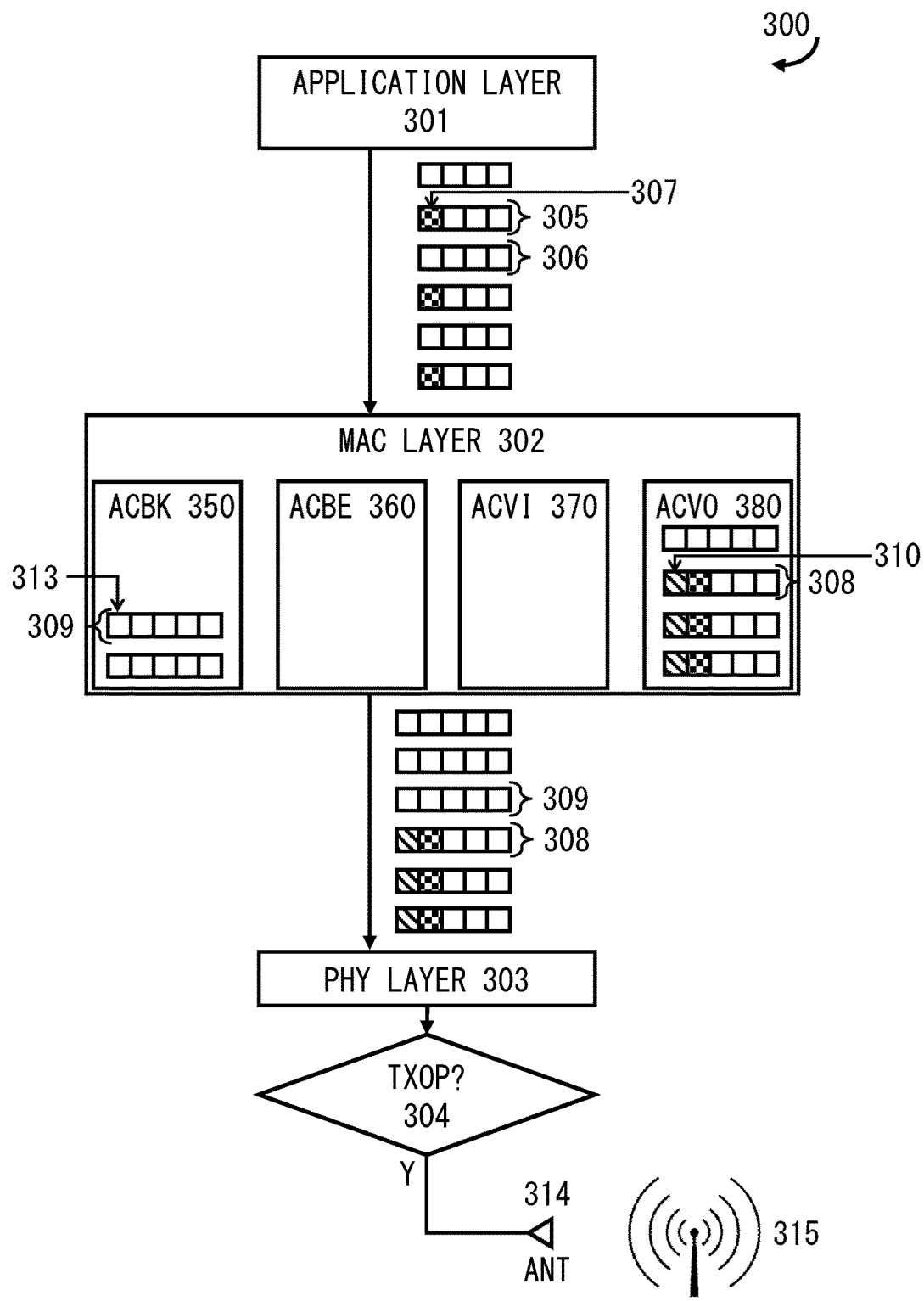
FIG. 3 illustrates the path and processing that traffic frames take according to an embodiment of the present disclosure.

FIG. 3 is a block diagram illustrating the journey of data packets 305, 306 as they travel through various layers of a protocol stack 300 from an application layer 301 executing a program on a wireless device 200 to the physical layer 303 of a network interface for transmission over a medium 315. In the OSI (Open Systems Interconnection) model, there are 7 layers of functionality in order of visibility to the end user. Layer 7, the application layer (301 in FIG. 3), is the domain of applications that process human-compatible input and output. Beneath that lies Layer 6, the presentation layer, responsible for, in one example, encryption and decryption of data for secure transmission. Layer 5, the session layer, manages persistent connections between machines (sessions) such as telnet, ftp, or http sessions. Beneath this, Layer 4, the transport layer, establishes numbered ports over which protocols such as TCP and UDP can work. Underneath this, Layer 3, the network layer, is where DNS, routers, and IP addresses make sure data travels to the right place anywhere in the world. Layer 2, the data link layer, responsible for maintaining logical LAN connections, comprises the Logical Link Control layer and a lower sublayer, the Medium Access Control (MAC) layer (302 in FIG. 3). Components on a LAN refer to one another by their MAC addresses. Finally, layer 1, the physical layer (303 in FIG. 3), controls the actual bit transmission over physical media such as radio waves and cables. The physical layer modulates, scrambles, and encodes signals to provide robust and private transmission. Some layers of the protocol stack are omitted in this discussion for clarity, as they do not perform any steps of the present disclosure.

With reference to FIG. 3, a generalized network packet 306 which has been generated by the application layer 301 is marked by an icon representing a series of information fields indicated by blank squares. An application may identify a network packet as a real time application (RTA) packet if the application generating it demands low latency, real-time communications. An RTA network packet 305 is marked by a similar icon except for an RTA identifier 307 symbolized by a first pattern fill in a square of the icon of the network packet 305. The exact format of the RTA identifier 307 is outside the scope of the present disclosure, but it may take the form, for example, of a packet type field or subfield in the packet header. This advantageously allows RTA packets to be treated differently from other packets when they reach the MAC layer. Network packets 306, 305, both general and RTA, may reach the MAC layer 302 in any order as a result of being generated by the application layer 301 or, in an alternate example, being received by the PHY layer 303 as traffic frames and decoded as having eventual destinations different from the wireless device 200 which received them. In this case, the MAC layer hardware 302 repackages a network packet into a new traffic frame for retransmission to its eventual destination.

To prepare network packets for traveling to other network nodes, the MAC layer hardware 302 prepends a MAC header onto each network packet, creating a MAC Protocol Data Unit (MPDU) of each one. The MAC header of an RTA MPDU 308 comprises an identifier (for example a frame type and subtype) represented by patterned fill square 310, whose value identifies the frame as an RTA frame. A blank square 313 occupying a similar position in an MPDU icon 309 signifies an identifier of a different value, signifying a general MPDU not from a real time application.

Figure 4:
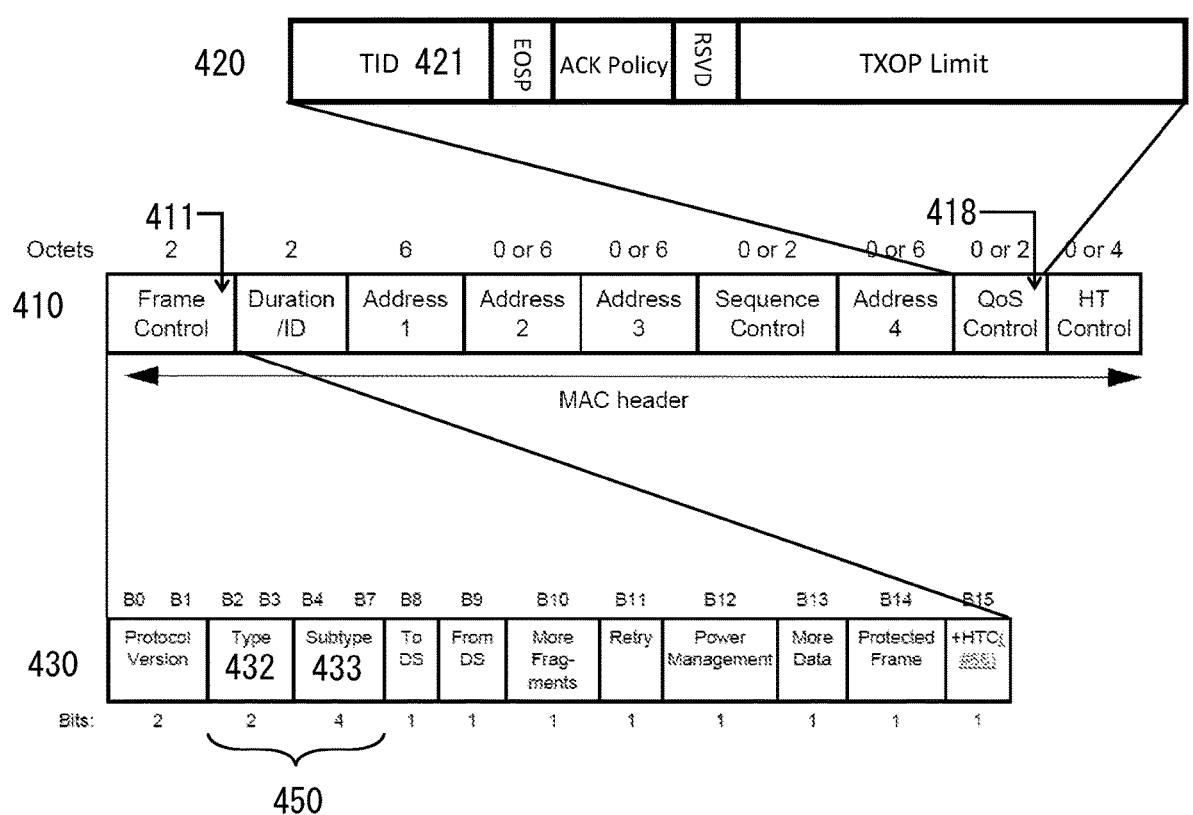
FIG. 4 illustrates the frame structure of an MPDU and possible locations of the Real Time Application Traffic identifier according to embodiments of the present disclosure.
Figure 5:
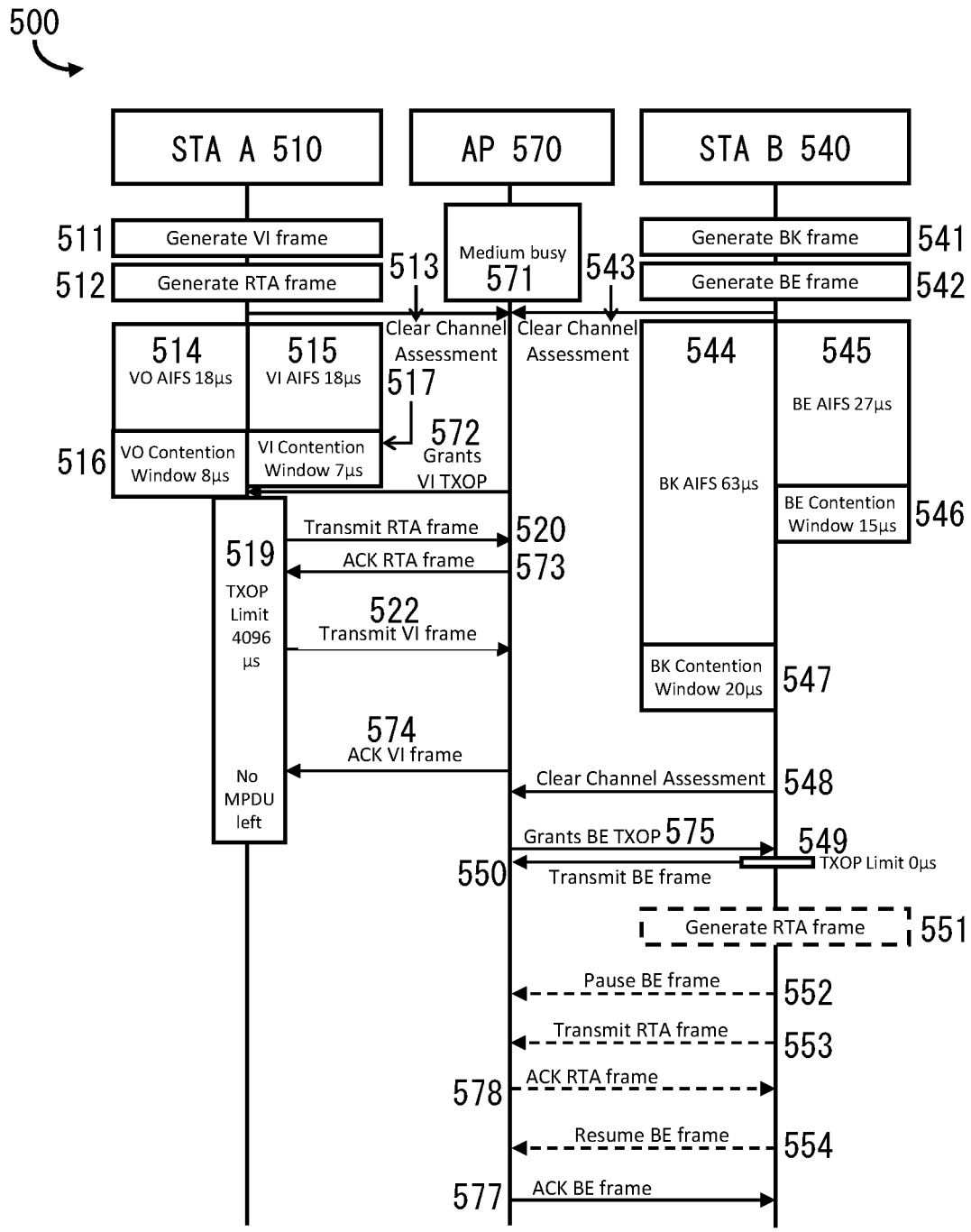
FIG. 5 is a flowchart illustrating operation of a WLAN Basic Service Set according to embodiments of the present disclosure.

A detailed structure of the MAC header, adapted from IEEE802.11-REVmd/D3.0, is given in FIG. 4. MAC header 410 comprises several fields, of particular note the frame control field 411 and Quality of Service (QoS) control field 418. The Frame Control field 411 comprises bit positions B2 and B3 432 indicating a Frame Type and bit positions B4 to B7 433 indicating a Frame Subtype. The possible values of these subfields differentiate between the various possible Management, Control, Data, and Extension frames. Frame type (expressed as B3B2) can take on values including 00 for Management, 01 for Control, 10 for Data, and 11 for Extension. The first three frame types already have all of their subtypes allocated to specific purposes. According to an embodiment of the present disclosure, the identifier 310, 450 comprises a novel combination of frame type 432 and subtype 433 values, which in combination 450 identify the MPDU as an RTA MPDU to any device capable of decoding the MAC header. A new subtype value in the range 1000 (B7B6B5B4) to 1111 of Frame type 11 for Extension frames is proposed to indicate that a traffic frame is QoS RTA Data. The setting of B7 to 1 retains backward compatibility with previously defined QoS Data frame subtypes of the Frame type 10 Data.

Thus, according to an embodiment of the present disclosure, the MAC hardware 302 prepends to RTA packets 305 a MAC header 410 comprising a frame type 11 and subtype ranging from 1000 to 1111, creating RTA MPDUs 308. To non-RTA packets 306 it prepends a MAC header 410 comprising a different combination of frame type and subtype 313, creating general MPDUs 309.

The other relevant portion of the MAC header to RTA MPDUs is the Quality of Service (QoS) control field. The QoS Control field format 420 comprises a subfield TID 421 used to identify the User Priority UP in a 3 bit value from 0 to 7 corresponding to the UP in Table 2. In an embodiment of the present disclosure, Real Time Application MPDUs 308 are assigned a UP of 6 or 7 to ensure they are mapped into the AC_VO access category 380.

The MAC layer hardware 302 maps the non-RTA traffic frames 309 into any of four Access Categories (AC) AC_BK 350, AC_BE 360, AC_VI 370, and AC_VO 380 based on the value of their User Priority according to Table 2. In general, a FIFO queue is maintained for each AC so that MPDUs queued first generally are transmitted before other MPDUs queued later in the same AC. Noting that information flow in FIG. 3 is represented as from the top to the bottom of the diagram, a frame positioned in the bottom of an access category queue is at the head of the queue. Advantageously according to the present disclosure, the MAC hardware 302 recognizes RTA MPDU 308 and others like it, queueing them first, overriding the FIFO ordering. Thus RTA traffic frames will transmit with priority before any other traffic in AC_VO 380 once a TXOP 304 is obtained for that queue.

The TXOP acts as a gate for PHY layer processing of MPDUs into physical medium traffic frames and transmission of the traffic frames. Contention for a TXOP in EDCA is carried out by EDCA Functions (EDCAF). Each AC's EDCAF accomplishes this by first checking for a clear channel indication and setting the network allocation vector to zero. It then waits for a time equal to its contention window, which is a sum of an arbitration interframe spacing (different for each AC) and a random backoff time. If the channel is still clear, the EDCAF attempts to access the medium. A collision arbitration function in the MAC layer 302 resolves any collisions (ties, simultaneous transmit attempts) between EDCAFs within the single STA. The winning EDCAF causes the STA to send MPDUs 308, 309 into the PHY 303 to try to transmit them as traffic frames. At this point, in the prior art, MPDUs from the queue of the winning AC would be sent to the PHY for transmission. However, a technical advantage is provided by an embodiment of the present disclosure in which no matter which EDCAF wins the contention, the first frames sent for transmission by the PHY layer 303 are to be the RTA frames 308 marked with the RTA frame type and subtype 450. Only after all RTA frames 308 are transmitted, may other frames 309 from the contention-winning AC be transmitted in FIFO order within the time limit defined by the TXOP 304. If the TXOP runs out before all RTA traffic is transmitted, the STA must contend again for another TXOP before transmitting the remaining RTA traffic frames and non-RTA frames.

In a case in which there are no RTA MPDUs 308 queued in AC_VO 380 and the STA 102 maintaining the queues 350 360 370 380 wins a TXOP 304 for a first AC, which may be for example AC_BK 350 or any of the other access categories, the leading MAC frame 309 in the first AC queue 350 will be sent to the PHY 303 for transmission. At some point during the transmission of the non-RTA frame 309, an RTA frame 308 may be put in queue in AC_VO 380 at the transmitting STA 102. According to the present disclosure, this RTA frame 308 will become the next frame to transmit, provided sufficient time remains in the TXOP. In one embodiment of the present disclosure, the RTA frame 308 will be given a non-preemptive priority, meaning the RTA frame 308 will transmit once the non-RTA frame 309 completes transmission, TXOP length permitting. In an alternate embodiment, the RTA frame 308 will be given a pre-emptive priority, meaning the non-RTA frame 309 will immediately cease transmission to free the wireless medium 315 for transmitting the RTA frame 308. In the case where the transmitting STA 102 notifies the receiving STA that the transmission is pausing, the non-RTA frame 309 can be resumed from the point of interruption once the RTA frame 308 transmission is completed, again TXOP length permitting. In the case where the transmitting STA 102 does not notify the receiving STA that the transmission is pausing, the frame fragment will be discarded at the receiver and the transmission must start from the beginning.

With reference to FIG. 5, a flowchart is now presented which describes the operation of a WiFi Basic Service Set (BSS) according to embodiments of the present disclosure. BSS 500 comprises, for example, at least an AP 570, STA A 510 and STA B 540. Each component of the BSS 500 is associated with a vertical timeline on the flowchart that proceeds from top to bottom in chronological order. Events internal to each component are marked with boxes, and transmission/reception/carrier sense events between components are marked with arrows representing the direction of information communication.

At the beginning of the flowchart, AP 570 is managing communications on a wireless link medium. The medium is characterized by a busy state 571 if, for example, the AP is transmitting management frames to other STAs that are not shown. Concurrently, STA A 510 is preparing data for network transmission, generating firstly an AC_VI category frame 511 and secondly an RTA type frame 512 which will be mapped to the AC_VO. STA B 540 is also preparing data for transmission, generating an AC_BK frame 541 and an AC_BE frame 542.

STAs A 510 and B 540 have data queued for transmission, they perform Clear Channel Assessments 513 and 543 to try and sense if PPDUs are being transmitted over the wireless medium, or if there is non-Wi-Fi energy present in the frequency channel (a 2.4 GHz baby monitor signal, for example). The STAs determine the channel is clear, so they begin to contend for the TXOP.

STA A 510 has two queues frames waiting to send: AC_VO and AC_VI. Both of these ACs use an AIFS of 2 timeslots, with a standard timeslot duration of 9 μs. Thus both the AC_VO AIFS 514 and AC_VI AIFS 515 will take 18 μs to elapse before these queues enter their contention window timers. The AC_BK queue at STA B 540 waits an AIFS 544 of 7 timeslots (63 μs), whereas the AC_BE AIFS 545 is 3 timeslots (27 μs).

The AIFS 514, 515 at STA A 510 will finish first, and each EDCAF contending within STA A will be assigned a random contention window time selected from the range of values configured for its respective AC. In the present example, the randomly generated values are 8 μs for the AC_VO contention window 516 and 7 μs for the AC_VI contention window 517. Thus the AC_VI EDCAF at STA A 510 will win contention for the medium and be granted the TXOP 572 by the AP. AC_VI is typically granted a TXOP length 519 of 4096 μs of contention-free time within which to send as many queued frames as are available in AC_VI.

According to existing QoS operation, the RTA frame 512 would have to wait for the AC_VI TXOP to end, and additionally until the next time AC_VO at STA A wins a TXOP, to be transmitted. But according to an embodiment of the present disclosure, STA A 510 checks to see if any RTA frames are in queue in AC_VO, despite AC_VO not winning the TXOP. In the present example there is one, and STA A begins transmission 520 of the RTA frame. At the conclusion of RTA frame transmission 520, the AP may reply with an acknowledgement (ACK) frame if needed 573 to notify STA A 510 of a successful reception. RTA frames from an online game, for example, are typically characterized by short packets of state data such as position, acceleration, sprite collision flags, and action initiation commands. As such, RTA transmission 520 will not cause much of a delay in the transmission 522 of the AC_VI frame, which begins just a SIFS (16 μs in 802.11ac) after the RTA's acknowledgement frame 573 is received at STA A 510. Thus a technical advantage is realized in saving precious milliseconds of latency in a real-time two-way communication application though not materially affecting the frame rate of a video transmission that is typically buffered by a few seconds to begin with.

When AC_VI transmission 522 concludes, and the AP 570 has acknowledged 574 the AC_VI frame, STA A 510 has no more frames left to send. Even though the TXOP limit 519 is far from over, STA A will stop transmitting, allowing other STAs including STA B 540 to sense a clear channel 548. At STA B 540, the AC_BE AIFS 545 of 27 µs was nearing completion, with 2 µs to go when the STA A contention window 517 finished. AC_BE contention window 546 is the next to begin counting down, from 15 µs in the present example. AC_BE at STA B will win the TXOP 549 next, as AC_BK did not finish its AIFS before the next frame 520 appeared on the channel, and AC_BK will need to start over its AIFS 544 and wait for a contiguous 63 µs of idle channel before contending.

Continuing the flowchart, AP 570 grants an AC_BE TXOP 575 to STA B 540. Accordingly, STA B 540 transmits the BE frame 550, and the AP responds with an ACK frame 577. It will be appreciated that processors that control wireless electronic devices are capable of performing tasks in parallel owing to multiple cores and multithreaded architecture. As such, during transmission of, for example, a large multi-millisecond AC_BE frame 550, in some embodiments STA B 540 may generate an RTA frame 551 and queue it in AC_VO before AC_BE frame transmission 550 completes. According to one embodiment of the present disclosure, the RTA frame 551 would receive non-preemptive priority and be queued next for transmission during the TXOP 549 after the conclusion of frame transmission 550 and frame acknowledgement 577. Whereas this next-in-line privilege eliminates the latency incurred by re-contending for the TXOP, the RTA frame would still have to wait the entire duration of the incumbent transmitting frame. To provide a further advantage in transmission promptness, in an alternate embodiment of the present disclosure, the RTA frame 551 would receive pre-emptive priority in order to advantageously avoid multiple milliseconds of latency. To implement pre-emptive priority, STA B pauses AC_BE frame transmission 552, transmits the RTA frame 553, and receives acknowledgement 578 from the AP 570 for the RTA frame. In one embodiment, STA B 540 resumes transmission 554 of the AC_BE frame, salvaging the effort 550 already spent on transmitting the first part of AC_BE frame. In an alternate embodiment, AP 570 does not allow the TXOP 549 to be extended to finish AC_BE frame transmission 554, and AC_BE must once again contend for a TXOP.

The above-described embodiments of the present disclosure, taken either individually or in combination, provide the technical benefit of reduced latency to real-time application traffic by circumventing the most common sources of transmission delay though incurring minimum impact to relatively delay-sensitive services such as video. The embodiments of the present disclosure significantly negatively impact the transmission delay only of frame-retry-tolerant background services such as email and bulk file transfer.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method of communicating over a wireless LAN comprising:
    obtaining, by a wireless electronic device, a transmission opportunity via Enhanced Distributed Channel Access for a first access category; and
    transmitting, by the wireless electronic device, a first traffic frame within the transmission opportunity, the first traffic frame comprising a header that includes a frame type subfield and a frame subtype subfield, values of the frame type subfield and frame subtype subfield identifying the first traffic frame as a real time application frame,
    wherein the first traffic frame is mapped to a second access category different from the first access category, and the first traffic frame is the first frame transmitted during the transmission opportunity.

2. The method of claim 1 wherein the second access category is AC_VO.

3. The method of claim 1 wherein the value of the frame type subfield is equal to a two-bit value "11."

4. The method of claim 1 wherein:
    a plurality of traffic frames, each comprising the frame type subfield and the frame subtype subfield identifying the plurality of traffic frames as real time application frames, are transmitted within the transmission opportunity before any traffic frames belonging to the first access category are transmitted; and
    no traffic frames comprising the frame type subfield and the frame subtype subfield identifying traffic frames as real time application frames are transmitted within the transmission opportunity after any traffic frames belonging to the first access category are transmitted.

5. A wireless electronic device for communicating over a wireless LAN comprising:
    one or more processors coupled to a network interface and a computer readable storage medium, the computer readable storage medium storing instructions executable by the one or more processors to:
    obtain a transmission opportunity via Enhanced Distributed Channel Access for a first access category; and
    transmit a first traffic frame within the transmission opportunity, the first traffic frame comprising a header that includes a frame type subfield and a frame subtype subfield, values of the frame type subfield and frame subtype subfield identifying the first traffic frame as a real time application frame,
    wherein the first traffic frame is mapped to a second access category different from the first access category, and the first traffic frame is the first frame transmitted during the transmission opportunity.

6. The wireless electronic device of claim 5 wherein the second access category is AC_VO.

7. The wireless electronic device of claim 5 wherein the value of the frame type subfield is equal to a two-bit value "11."

8. The wireless electronic device of claim 5 wherein:
    a plurality of traffic frames, each comprising the frame type subfield and the frame subtype subfield identifying the plurality of traffic frames as real time application frames, are transmitted within the transmission opportunity before any traffic frames belonging to the first access category are transmitted; and
    no traffic frames comprising the frame type subfield and the frame subtype subfield identifying traffic frames as real time application frames are transmitted within the transmission opportunity after any traffic frames belonging to the first access category are transmitted.

* * * * *